United States Patent
Park (10) Patent No.: US 7,645,965 B2
(45) Date of Patent: Jan. 12, 2010

(54) MICROWAVE OVEN HAVING A COFFEE MAKER

(75) Inventor: Man Su Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 391 days.

(21) Appl. No.: 10/549,916

(22) PCT Filed: Mar. 19, 2004

(86) PCT No.: PCT/KR2004/000599

§ 371 (c)(1),
(2), (4) Date: Sep. 20, 2005

(87) PCT Pub. No.: WO2004/083732

PCT Pub. Date: Sep. 30, 2004

(65) Prior Publication Data

US 2006/0191913 A1 Aug. 31, 2006

(30) Foreign Application Priority Data

Mar. 21, 2003 (KR) .................. 10-2003-0017802
Mar. 21, 2003 (KR) .................. 10-2003-0017805

(51) Int. Cl.
*H05B 6/64* (2006.01)
(52) U.S. Cl. ...................... 219/679; 219/678
(58) Field of Classification Search ............. 219/679, 219/678
See application file for complete search history.

(56) References Cited

U.S. PATENT DOCUMENTS

| | | | | |
|---|---|---|---|---|
| 5,463,932 A | * | 11/1995 | Olson | 99/280 |
| 5,491,322 A | * | 2/1996 | Waligorski | 219/689 |
| 6,006,655 A | * | 12/1999 | Bielfeldt et al. | 99/306 |
| 6,227,102 B1 | * | 5/2001 | Sham et al. | 99/286 |
| 6,401,597 B1 | * | 6/2002 | Stettes et al. | 99/289 T |
| 6,737,620 B2 | * | 5/2004 | Kim | 219/679 |

FOREIGN PATENT DOCUMENTS

| | | |
|---|---|---|
| EP | 1343356 A2 | 9/2003 |
| JP | 03-037220 A | 2/1990 |

* cited by examiner

*Primary Examiner*—Daniel L Robinson
(74) *Attorney, Agent, or Firm*—Birch, Stewart, Kolasch & Birch, LLP (57) ABSTRACT

Disclosed is a microwave oven having a coffee maker with a structure wherein a user can easily clean a filter basket (420), the microwave oven includes a first housing (100) having a cooking chamber (110) being opened or closed by a door (130) and a component chamber (120) having components for irradiating microwave into the cooking chamber (110), a second housing (200) provided in the first housing (100) and having an open side, a water reservoir (300) provided in the second housing (200), a filter basket assembly (400) provided to be withdrawn from or inserted into the second housing (200) and separated from the water reservoir (300), a water supplying tube supplying water in the water reservoir (300) to the filter basket assembly (400), a heater for heating water flowing in the water supplying tube and a container (700) provided to be withdrawn from or inserted into the second housing (200) for receiving coffee dropped from the filter basket assembly (400).

17 Claims, 13 Drawing Sheets

MICROWAVE OVEN HAVING A COFFEE MAKER

TECHNICAL FIELD

The present invention relates to a microwave oven, and more particularly, to a microwave oven having a coffee maker.

BACKGROUND ART

Figure 1:
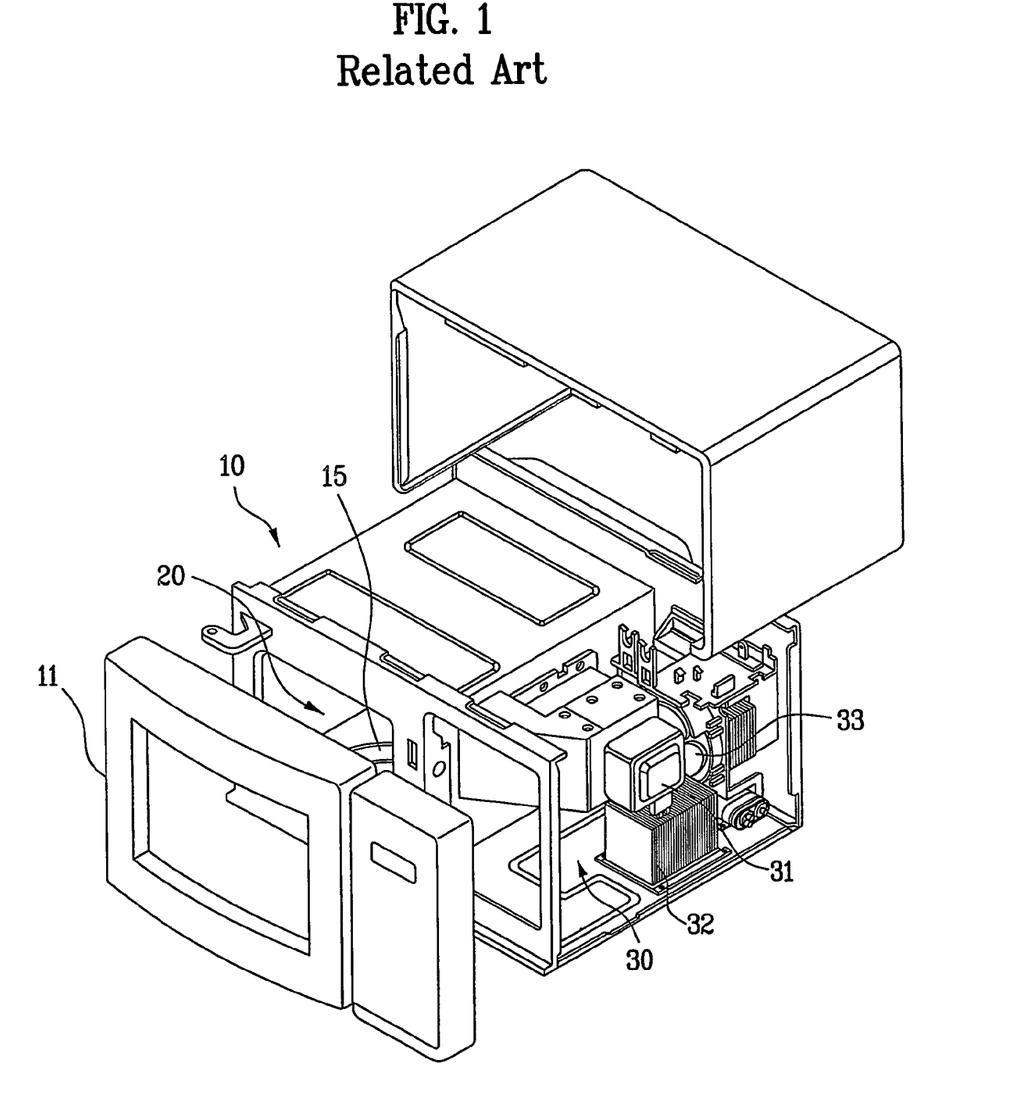
FIG. 1 illustrates an exploded perspective view showing a conventional microwave oven.

A microwave oven is an apparatus for thawing or heating food by using microwaves. A general structure of the microwave oven is illustrated in FIG. 1. Hereinafter, the microwave will be described in more detail referring to FIG. 1.

Referring to FIG. 1, a conventional microwave oven includes a cooking chamber 20, component chamber 30, electric components provided in the component chamber, and a housing 10.

The cooking chamber 20 is a cavity for accommodating food therein, and having an opened front for inserting or withdrawing the food. In the cooking chamber 20, a tray 15 is rotatably provided, and a door 11 is provided for opening and closing the cooking chamber 20 in front of the cooking chamber 20.

The component chamber 30 is provided adjacent to the cooking chamber 20, and electric components such as a magnetron 31 and a transformer 32 are provided thereto for irradiating the microwaves into the cooking chamber 20. At the component chamber 30, a fan 33 is provided in the cooking chamber 20 for cooling the electric components or for forming air circulation currents in the cooking chamber 20.

Meanwhile, the housing 10 is provided to cover the cooking chamber 20 and an outside of the component chamber 30 as illustrated in FIG. 1. When the microwave oven is operated after food is put on the tray 15, the tray 15 is rotated. Simultaneously, the microwaves generated in the magnetron 31 are irradiated into the cooking chamber 20.

The microwave thaws or heats the food on the tray 15 by vibrating water molecule in the food. In this case, the tray 15 is rotated, and thus the food is thoroughly and uniformly heated.

The microwave oven with the abovementioned function has an advantage of safely and quickly cooking the food. Although there is the above-mentioned advantage, there is a disadvantage that it is not possible to cook various kinds of food. For example, coffee modern people enjoys is not brewed through the microwave oven, and a separate coffee maker is used for brewing coffee.

In the meantime, recently, living space becomes smaller and consumers tend to prefer to practical products. Accordingly, various necessities are becoming smaller together with the electric appliance, and products performing not only a traditional function but also various functions are requested by consumers. However, the customers are not satisfied with such conventional microwave oven.

DISCLOSURE OF INVENTION

Accordingly, the present invention is directed to a microwave oven having a coffee maker that substantially obviates one or more problems due to limitations and disadvantages of the related art.

An object of the present invention is to provide a microwave oven having a coffee maker having not only a function of cooking foods by using microwaves but also a function of brewing coffee.

Another object of the present invention is to provide a microwave oven having a coffee maker with a structure wherein a filter basket assembly and a water reservoir are easily cleaned.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a microwave oven having a coffee maker includes a first housing having a cooking chamber which is opened or closed by a door and a component chamber with electric components provided therein for irradiating microwave into the cooking chamber, a second housing provided in the first housing and having an open side, a water reservoir provided in the second housing, a filter basket assembly provided to be withdrawn from or inserted into inside of the second housing and being separated from the water reservoir, a water supplying tube supplying water in the water reservoir to the filter basket assembly, a heater for heating water flowing through the water supplying tube and a container provided to be withdrawn from or inserted into the second housing for receiving coffee dripped from the filter basket assembly.

In another aspect of the present invention, a microwave oven having a coffee maker includes a first housing including a cooking chamber and a component chamber, the cooking chamber opened or closed by a door, the component chamber including electric components provide therein for irradiating microwave into the cooking chamber, a second housing provided in the first housing and having an opened front, a water reservoir provided in the second housing, a filter basket assembly hinge-coupled to a front of the second housing and provided in front of the water reservoir, a water supplying tube for supplying water in the water reservoir to the filter basket assembly, a heater for heating water flowing through the water supplying tube, and a container provided to be withdrawn from or inserted into the second housing for receiving coffee dripped from the filter basket assembly.

In another aspect of the present invention, a microwave oven having a coffee maker includes a first housing including a cooking chamber and a component chamber, the cooking chamber opened or closed by a door and the component chamber including electric components provided therein for irradiating microwave into the cooking chamber, a second housing provided in the first housing and having an opened front, a water reservoir provided in the second housing, a filter basket assembly hinge-coupled to a side of the second housing and provided at a same height as that of the water reservoir, a water supplying tube for supplying water in the water reservoir to the filter basket assembly, a heater for heating water flowing in the water supplying tube, and a container provided to be withdrawn from or inserted into the second housing for receiving coffee dripped from the filter basket assembly.

It is preferable that the second housing is provided in front of the component chamber, and is provided next to the cooking chamber.

And, the water reservoir includes a receiving portion recessed on an outer surface thereof for receiving a part of the filter basket assembly. In this case, the receiving portion can be provided at either a front of the water reservoir or at a corner of the front of the water reservoir.

It is also preferable that the water reservoir is enabled to be withdrawn from the second housing and the water reservoir comprises a handle projected on an outer surface of the water reservoir for easy grip. In the present invention, for lowering a height of the coffee maker provided in the microwave oven, the water reservoir and the filter basket assembly are provided at a same height.

Meanwhile, the second housing comprises a bracket projected from an inner wall of the second housing for supporting the water reservoir, and the bracket is elongated and is formed on an inner wall of the second housing for withdrawing the water reservoir from the second housing.

It is preferable that the filter basket assembly is rotatably attached to the second housing such that the water reservoir is easily withdrawn. The filter basket assembly includes a cover hinge-coupled to the second housing, and a filter basket separably coupled to the cover. In this case, the cover is hinge-coupled to a front or a side of the second housing. The filter basket assembly further includes a filter in a form of net inserted into the filter basket.

When the cover is coupled to the front of the second housing, the front of the cover has a surface continuous with a front of the door. In this case, it is preferable that the cover is attached to the second housing such that the water reservoir is easily withdrawn when the cover is separated from the filter basket.

Contrary to this, when the cover is coupled to the side of the second housing, the front of the cover has a surface continuous with a front of the door and a side of the cover has a surface continuous with the side of the second housing. In this case, the cover is rotatably attached to the second housing such that the water reservoir is easily withdrawn in a state that the cover is coupled to the filter basket.

Meanwhile, an extension member is provided at any one of the cover and the filter basket, and a supporter being provided at the other one of the cover and the filter basket for supporting the extension member. The container is able to be withdrawn from the second housing separate from the filter basket assembly.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention, and are incorporated in, and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
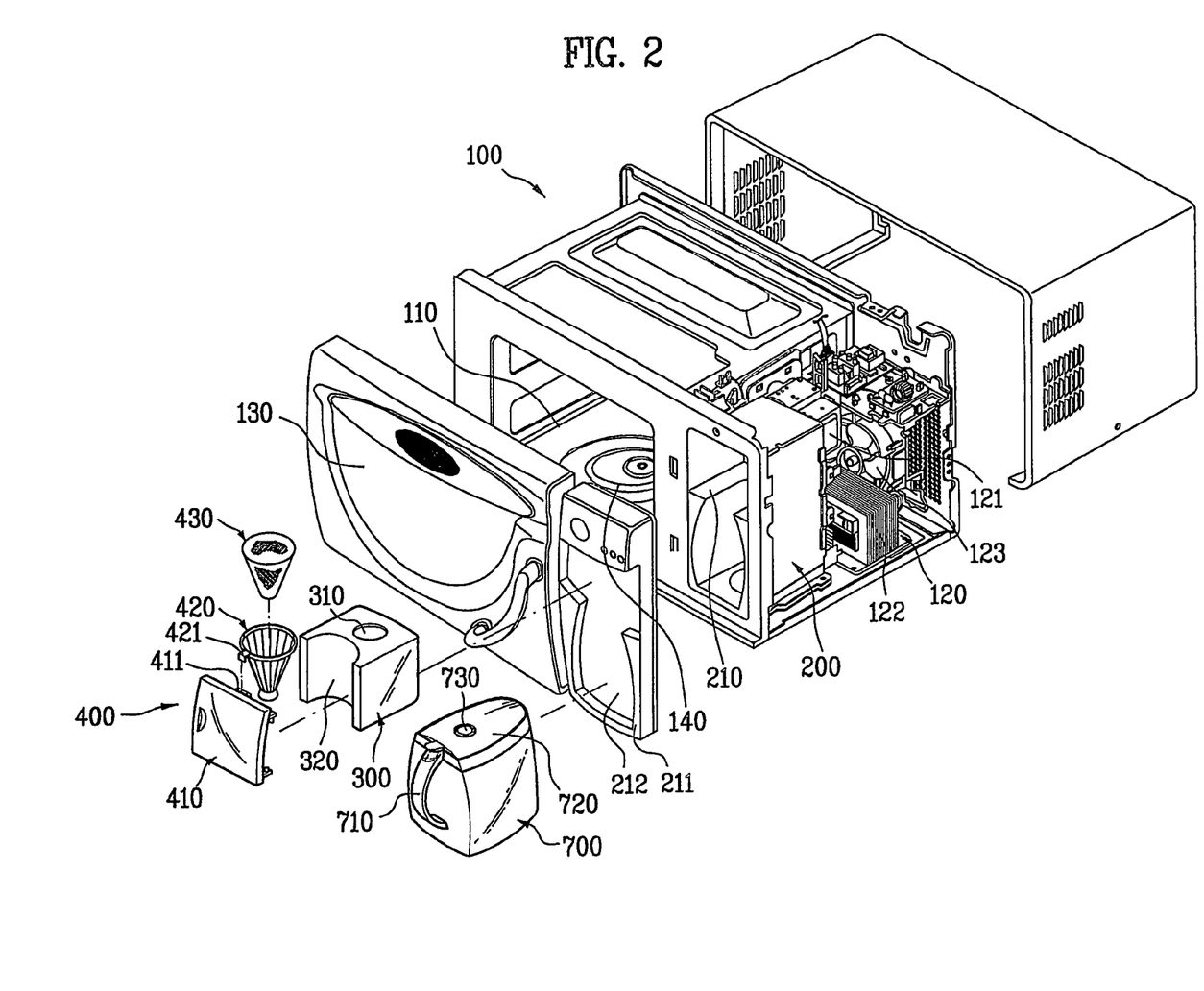
FIG. 2 illustrates an exploded perspective view showing a microwave oven having a coffee maker in accordance with a first embodiment of the present invention.
Figure 6:
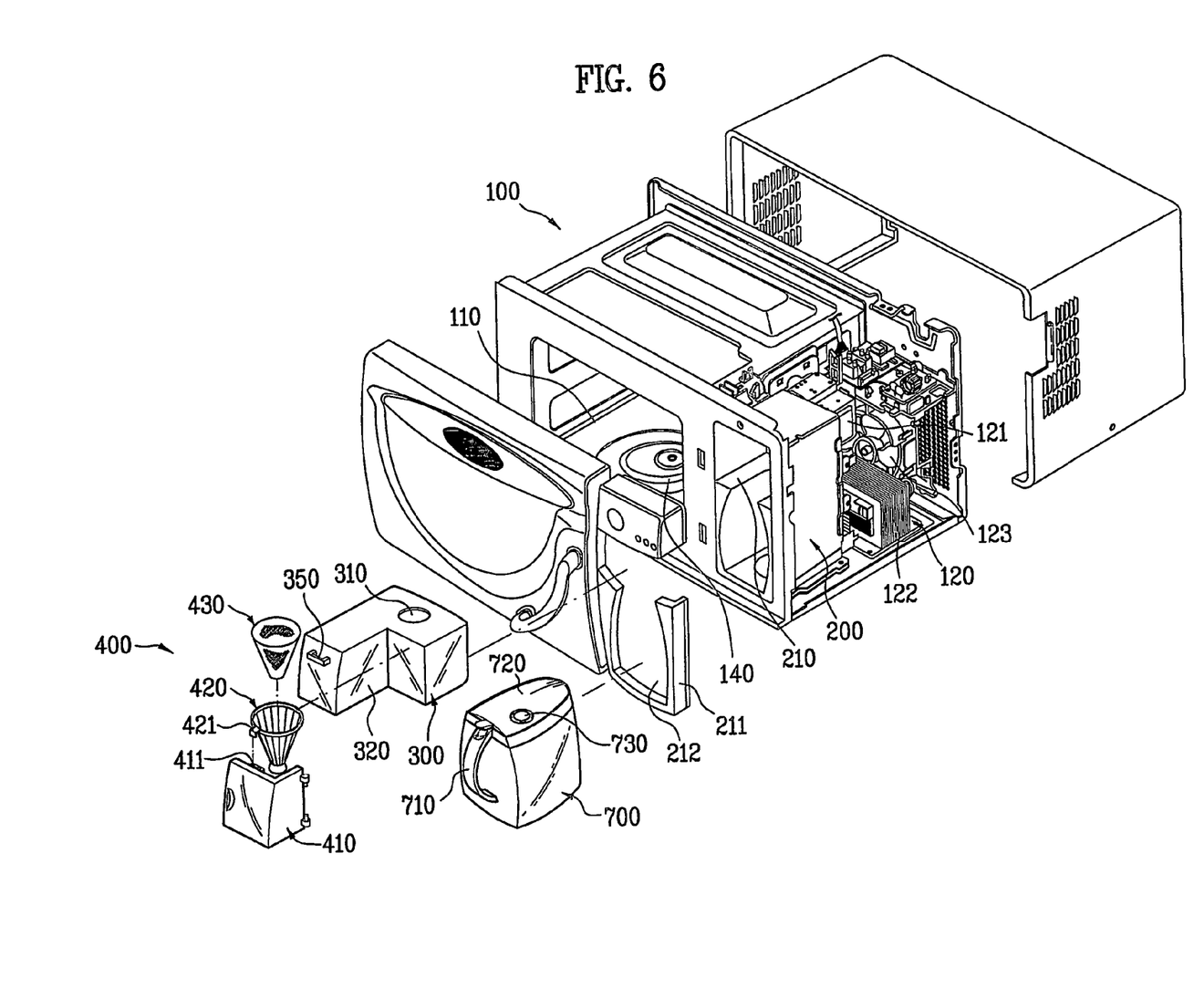
FIG. 6 illustrates an exploded perspective view showing a microwave oven having a coffee maker in accordance with a second embodiment of the present invention.

FIG. 2 illustrates an exploded perspective view showing a microwave oven having a coffee maker in accordance with a first embodiment of the present invention, and FIG. 6 illustrates an exploded perspective view showing a microwave oven having a coffee maker in accordance with a second embodiment of the present invention. As illustrated in the drawings, the microwave oven in accordance with the present invention includes a first housing 100, a second housing 200, a water reservoir 300, a filter basket assembly 400, a water-supplying tube 500, a heater 600, and a container 700.

In this case, in the housing 100, provided are a cooking chamber 110 with an opened front and a component chamber 120 with electric components provided therein. In front of the cooking chamber 110, a door 130 is hinge-coupled for opening and closing the cooking chamber 110. On a bottom surface of the cooking chamber 110, a tray 140 is rotatably provided.

The component chamber 120 is provided adjacent to the cooking chamber 110, for example, on a side of the cooking chamber 110. At the component chamber 120, a plurality of electric components such as a magnetron 121, a transformer 122, and a fan 123 is provided for irradiating microwaves into the cooking chamber 110.

In this case, the transformer 122 receives the electric power and converts it into high voltage power, and the magnetron 121 receives the high voltage power from the transformer 122 and generates the microwaves which are irradiated into the cooking chamber 110. The fan 123 blows outside air to the components, specially emitting large amount of heat when they work, such as the magnetron 121 and the transformer 122, for cooling down the components. Furthermore, the fan 123 also forms air circulation currents in the cooking chamber 110.

The second housing 200 includes a space for accommodating the water reservoir 300, the filter basket assembly 400, and the container 700. And a side of the second housing 200, for example a front is opened. The second housing 200 is provided in the first housing forming the outer case of the microwave oven.

In this case, it is preferable that the second housing 200 includes a front panel 211 provided on the opened front so as to improve the appearance of the microwave oven. The front panel 211 includes an opening 212 for communicating an outside of the front panel 211 with inside of the second housing 200. The front panel 211 includes a plurality of buttons for operating the coffee maker and the microwave oven.

Meanwhile, it is preferable that the second housing 200 is provided in the first housing 100 not to change sizes of the cooking chamber and the first housing 100 in the microwave oven in accordance with the present invention. Furthermore, for a user to easily use the coffee maker provided in the microwave oven, it is preferable that the housing 200 is provided next to the cooking chamber 110 and in front of the component chamber 120.

For providing the second housing 200 in the first housing 100 and also in front of the component chamber 120, it is preferable that the electric components such as the magnetron 121, the transformer 122 and the fan 123 are densely provided at a rear part of the component chamber 120. Together with the abovementioned, because a plurality of electric components are provided in the component chamber 120, it is preferable that a size of the fan 123 cooling the component chamber 120 is enlarged, or the performance of the component chamber 120 is improved by improving a structure of a ventilation passage of the component chamber 120.

The water reservoir 300 is provided in the second housing 200. The water reservoir 300 has a space for holding water, and an opening 310 for supplying water at a side thereof, for example at a top portion thereof. The water reservoir 300 is provided at a top portion in the second housing 200, and the second housing 200 has a bracket 210 on an inner wall thereof for supporting the water reservoir 300.

In this case, it is preferable that the water reservoir 300 is provided to be withdrawn from the second housing 200 to outside of the second housing 200 for the user to easily supply water and also clean the water reservoir 300. For this, it is preferable that the bracket 210 is elongated and is provided on an inner wall of the second housing 200 as illustrated in FIG. 2 and FIG. 6. If the bracket 210 is provided in said way, the water reservoir 300 is withdrawn for supplying water and inserted into inside of the second housing 200 for supporting the bracket 210. Therefore, the structure is very simple and practical.

Figure 9A:
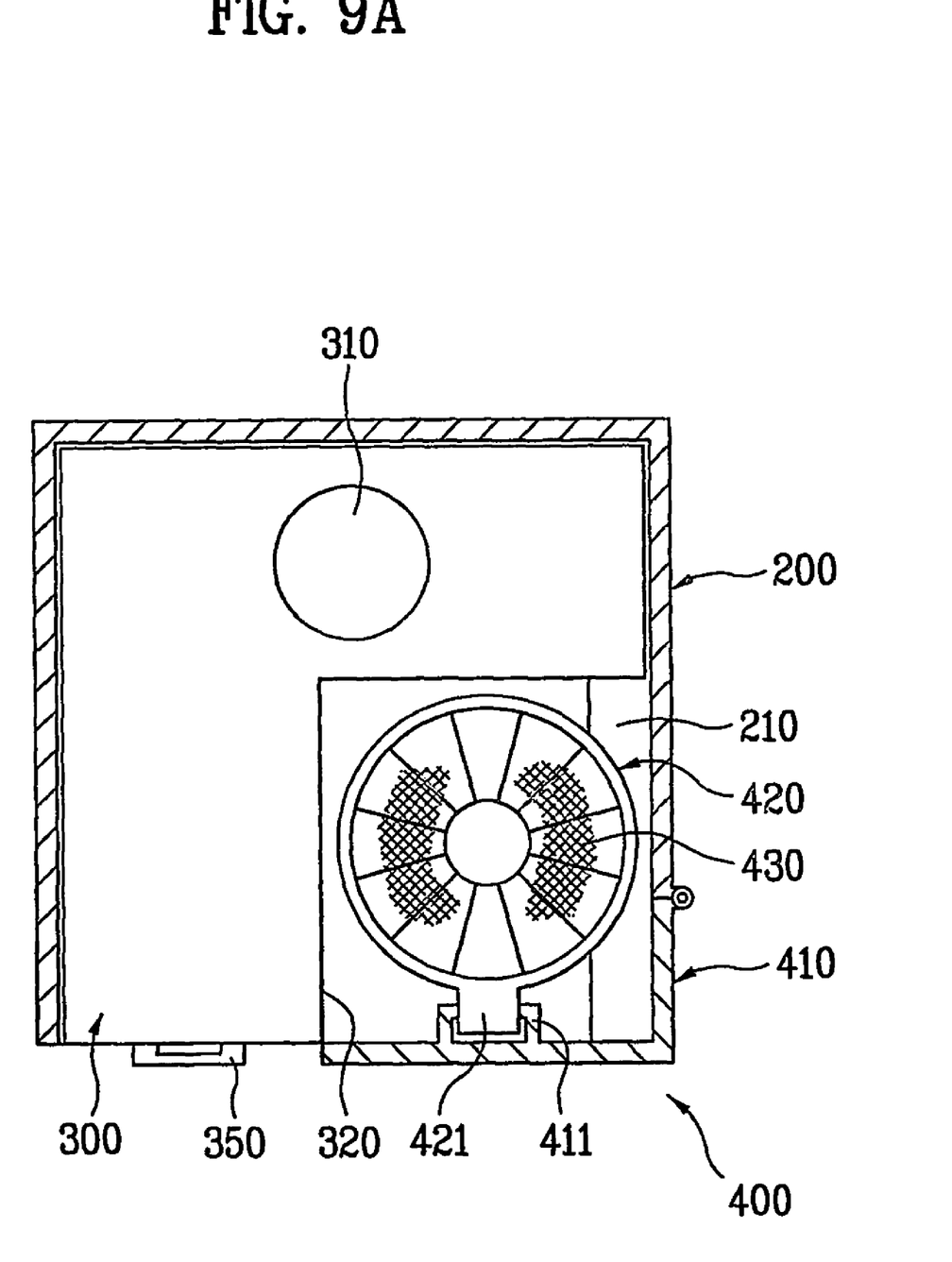
FIG. 9*a* through FIG. 9*c* illustrate plane cross-sectional views showing a process of withdrawing a water reservoir from a coffee maker.

A handle 350 is provided on an outer surface of the water reservoir 300 as illustrated in FIG. 6 for easy grip such that the user can easily withdraw the water reservoir 300. Although the handle at the water reservoir 300 is not illustrated in FIG. 2, the handle is provided on a front side of the water reservoir 300. Meanwhile, although the handle 350 can be provided not to expose outside, the handle 250 can be provided to expose outside as illustrated in FIG. 9.

The filter basket assembly 400 is provided as a separate body from the water reservoir 300. The filter basket assembly 400 is provided to be withdrawn from or inserted into inside of the second housing 200, for this, it is preferable that the filter basket assembly 400 is hinge-coupled with the second housing 200.

The filter basket assembly 400 can be provided under the water reservoir 300. However, in this case, height of the coffee maker and the microwave needs to be increased. Accordingly, it is preferable that the filter basket assembly 400 is provided in front of the water reservoir 300 at a same height as the water reservoir 300 such that there is no need to increase the height of the microwave.

Meanwhile, the filter basket assembly 400 includes a cover 410 being hinge-coupled with the second housing 200, and a filter basket 420 separably coupled to the cover 410.

The cover 410 opens an opened front of the second housing 200, in more detail, an opening 212 of the front panel of the second housing 200. In this case, although the cover 410 can be provided for wholly opening the opening 212, it is preferable that the cover 410 is provided for opening only the top portion of the opening 212 such that the user can withdraw or insert the container 700 only separate from the filter basket assembly 400.

Meanwhile, the cover 410 is hinge-coupled with the front of the second housing 200 in accordance with the first embodiment of the present invention as illustrated in FIG. 1. Accordingly, hereinafter, the structure of the cover 410 will be described in each embodiment.

Referring to FIG. 2, the cover 410 of the first embodiment is hinge-couple with the front of the front panel 211 constructing the front portion of the second housing 200 so as to open the opening 212. It is preferable that the front of the cover 140 has a surface that is continuous with the front of the door 130 in order to improve an appearance of the microwave oven.

In case provided in front of the water reservoir 300, it is preferable that the filter basket assembly 400 is rotatably attached to the second housing such that the water reservoir 300 is easily withdrawn from or inserted into inside of the second housing 200. In other words, the water reservoir 300 needs to be easily withdrawn or inserted when the filter basket assembly 400 is completely rotated.

Figure 5A:
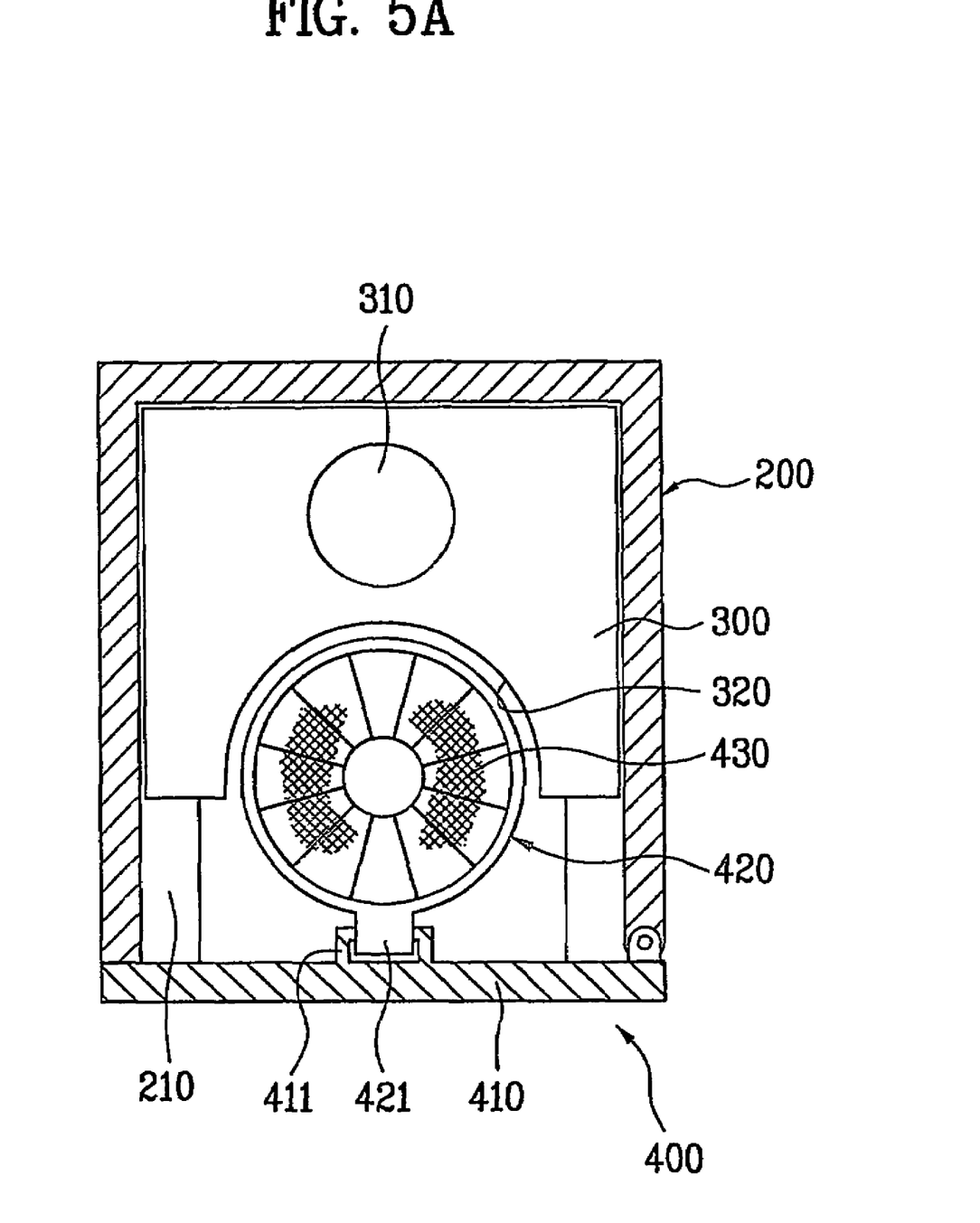
FIGS. 5*a* to 5*c* illustrates plane cross-sectional views showing a process of withdrawing a water reservoir from a coffee maker.
Figure 5B:
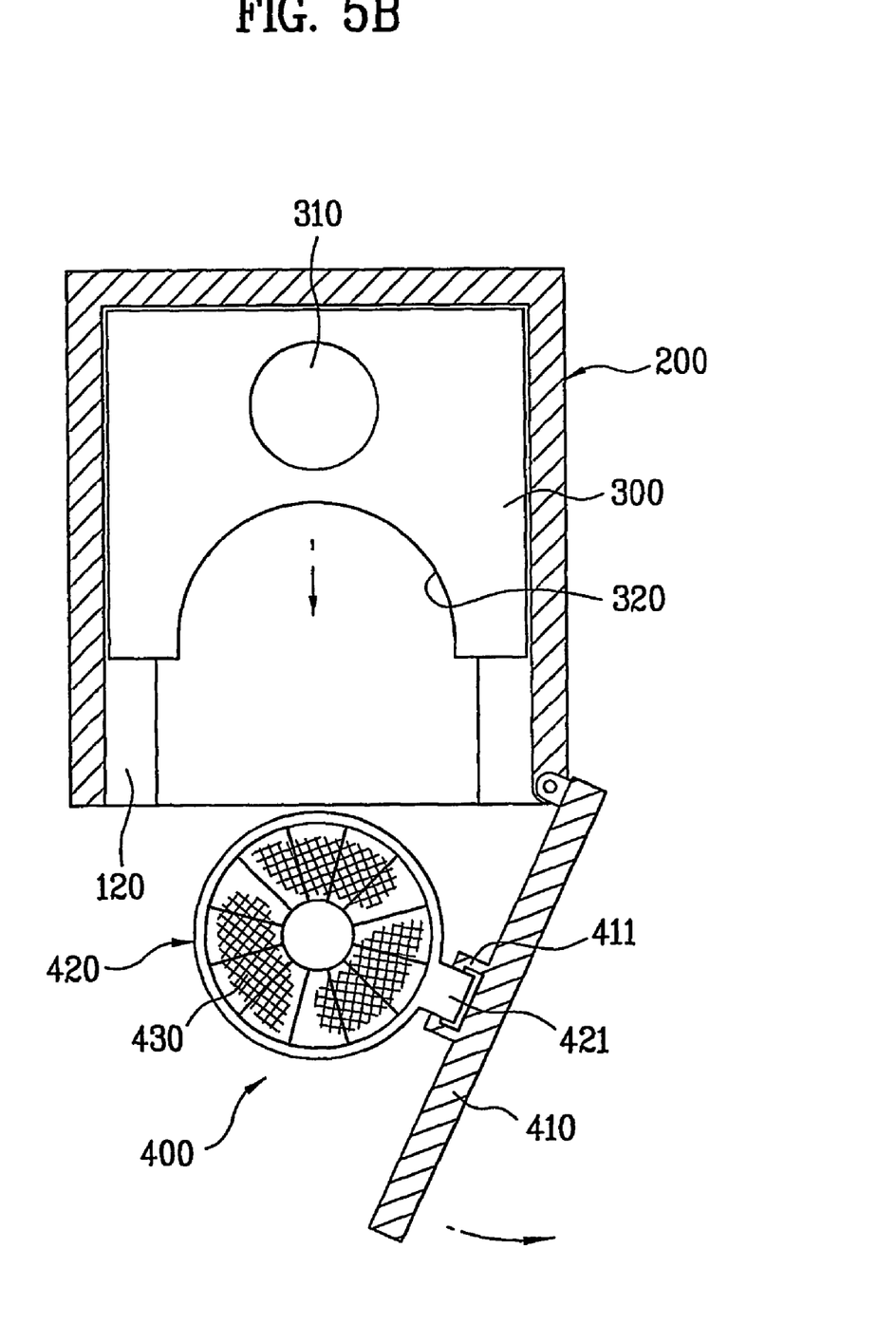
Figure 5C:
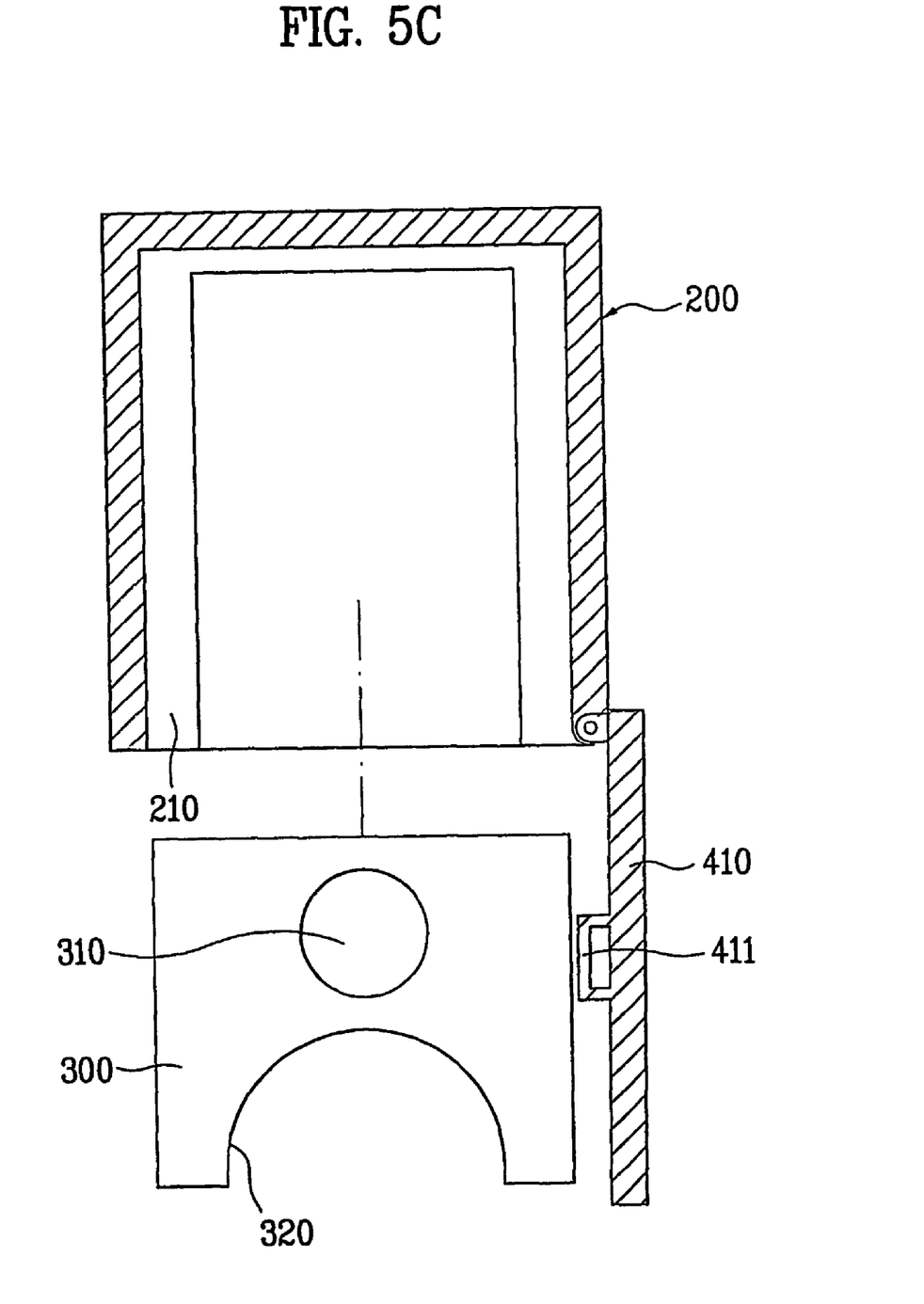

In the case of the first embodiment, the cover 410 is rotated to be almost perpendicular to the front of the second housing 200 as illustrated in FIG. 5c. In this case, the basket 420 is separated from the cover 410 for withdrawing or inserting the water reservoir 300. However, the cover 410 can be rotated by more degrees than the degree illustrated in FIG. 5.

Referring to FIG. 6, the cover 410 of the second embodiment is provided at a side of the second housing 200. In this case, although the cover 410 may be provided on a front of the front panel 211 constructing the front portion of the second housing 200, FIG. 6 illustrates an example of the cover being hinge-coupled with a fixed portion in the first housing 100 in the second housing 200. In the case of FIG. 6, on the side of the front panel 211, provided is a cut away portion into which the cover is inserted.

In the second embodiment, the cover 410 includes a plane surface bent in a form of "L". In this case, it is preferable that the side of the of the cover 140 has a surface that is continuous with the side of the first housing 100 and the front of the cover 140 has a surface that is continuous with the front of the door 130 in order to improve the appearance of the microwave oven.

In case the cover 410 is provided at the side of the second housing 200, it is easy to withdraw or insert the water reservoir provided at the same height. In other words, even in a case that the basket 420 is coupled with the cover 410 as illustrated in FIG. 9c, the water reservoir 300 is easily withdrawn without being caught into the basket 420.

It is preferable that a groove or a handle is provided to the cover 410 installed as abovementioned. Then the user can rotate the cover 410 by using the groove or the handle. However, not limited to this, the cover can be provided in a structure that the cover is opened by the elasticity when the cover is pressed backward the front panel 211.

Meanwhile, the basket 420 is separably coupled to the cover 410. For this, it is preferable that an extension member 421 is provided at any one of the cover 410 and the filter basket 420, and a supporter 411 being supported by the extension member 421 is provided at the other one of the cover 410 and the filter basket 420.

As a reference, FIG. 2 and FIG. 6 illustrate an example showing that a hook is provided as the extension member 421, and a loop having the hook inserted thereto is provided as a supporter 411.

The basket 420 has a same structure as that employed to a conventional coffee maker. The basket 420 is formed in a funnel having a diameter of top portion thereof is larger than that of the lower portion thereof. At a lower part of the basket 420, a hole (not shown) is formed for dropping coffee liquid. A valve is provided at the bracket 210 for opening and closing the hole.

In the mean time, when the cover 410 is closed, the basket 420 is provided between the cover 410 and the water reservoir 300 as illustrated in FIG. 5a and FIG. 9a. Accordingly, it is preferable that a part of the filter basket assembly 400, particularly a receiving portion 320 for receiving the basket 420 on an outer surface of the water reservoir 300.

In the case of the first embodiment, the receiving portion 320 recessed on the front of the water reservoir 300 is provided for receiving the basket 420 as illustrated in FIG. 2. In the second embodiment, the receiving portion 320 recessed at a front corner of the water reservoir 300 is provided as shown in FIG. 6.

When the receiving portion is provided at the water reservoir 300, size of the water reservoir 300 is not reduced, and depth of the second housing 200 is reduced.

Meanwhile, a filter 430 is provided in the basket 420 as illustrated in FIG. 2 and FIG. 6. The filter 439 is formed in a net form, and coffee powder is put thereto. If the filter 430 in the form of a net as abovementioned, there is no need to provide a paper filter separately, and also is no need to provide a separate valve being provided to the hole for dripping the coffee when the coffee is brewed in the filter basket 420.

Figure 3:
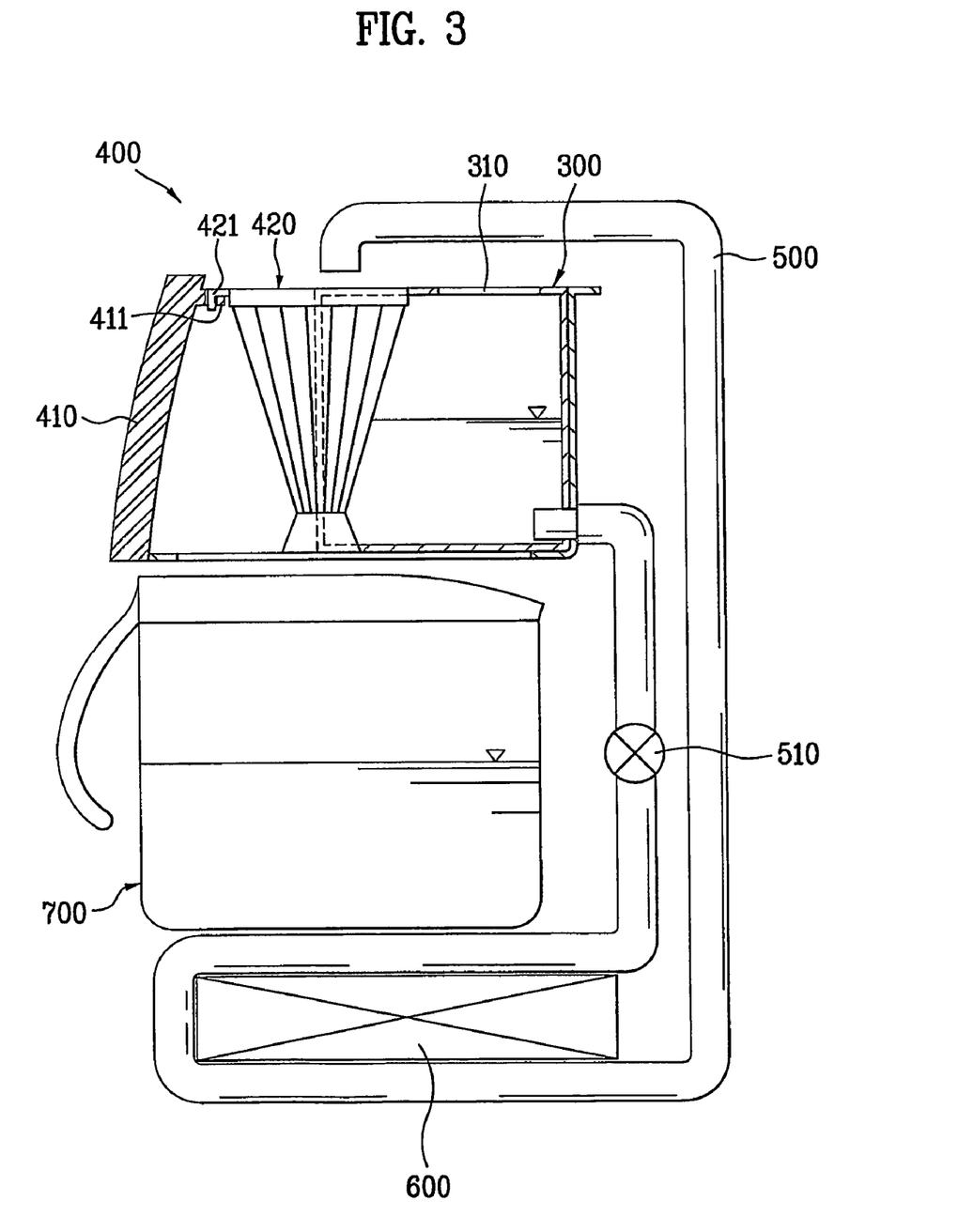
FIG. 3 illustrates a cutaway view showing a coffee maker without having a second housing in a microwave oven of FIG. 2.
Figure 4:
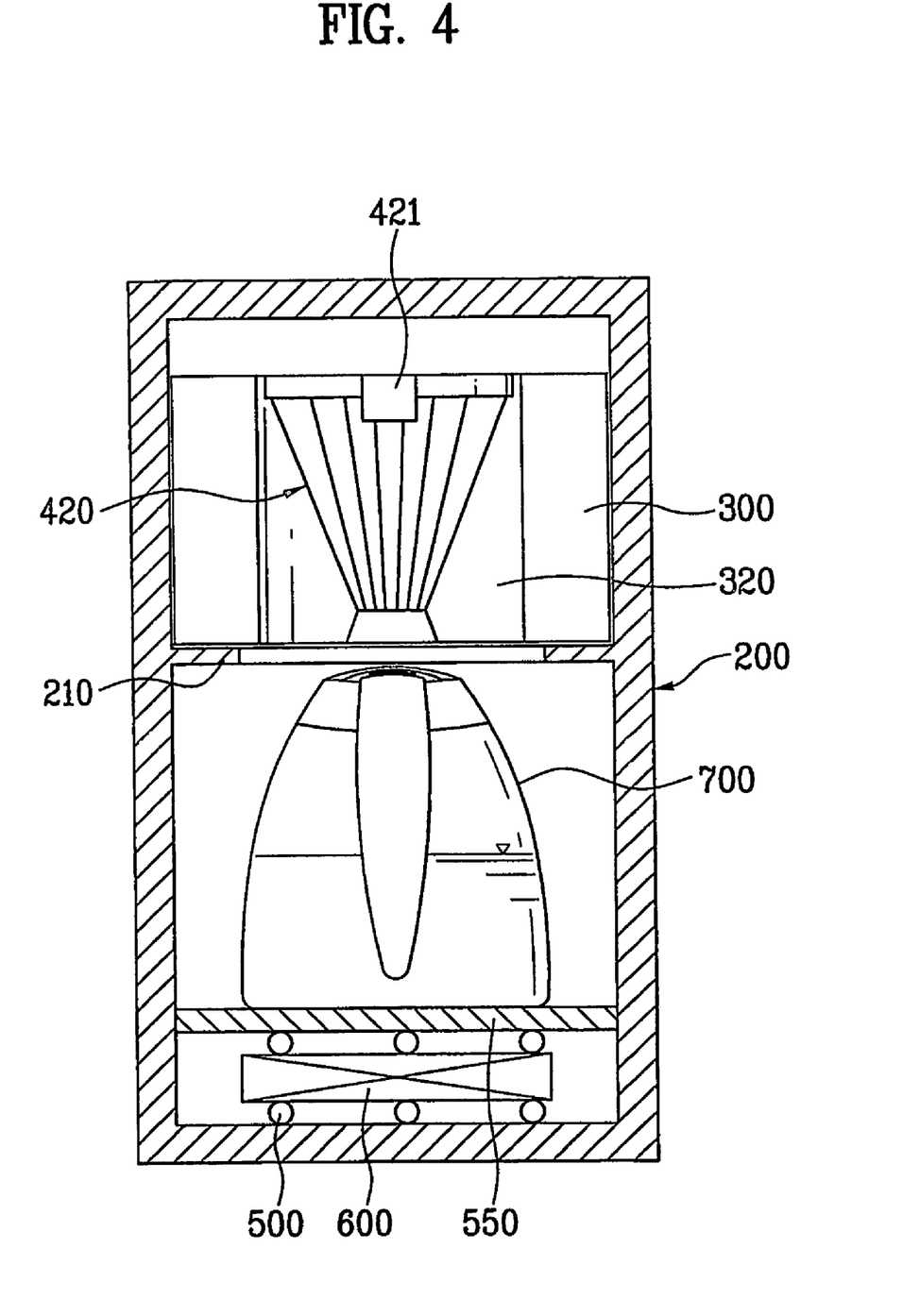
FIG. 4 illustrates a plane cross-sectional view showing a coffee maker in the microwave oven of FIG. 2.
Figure 7:
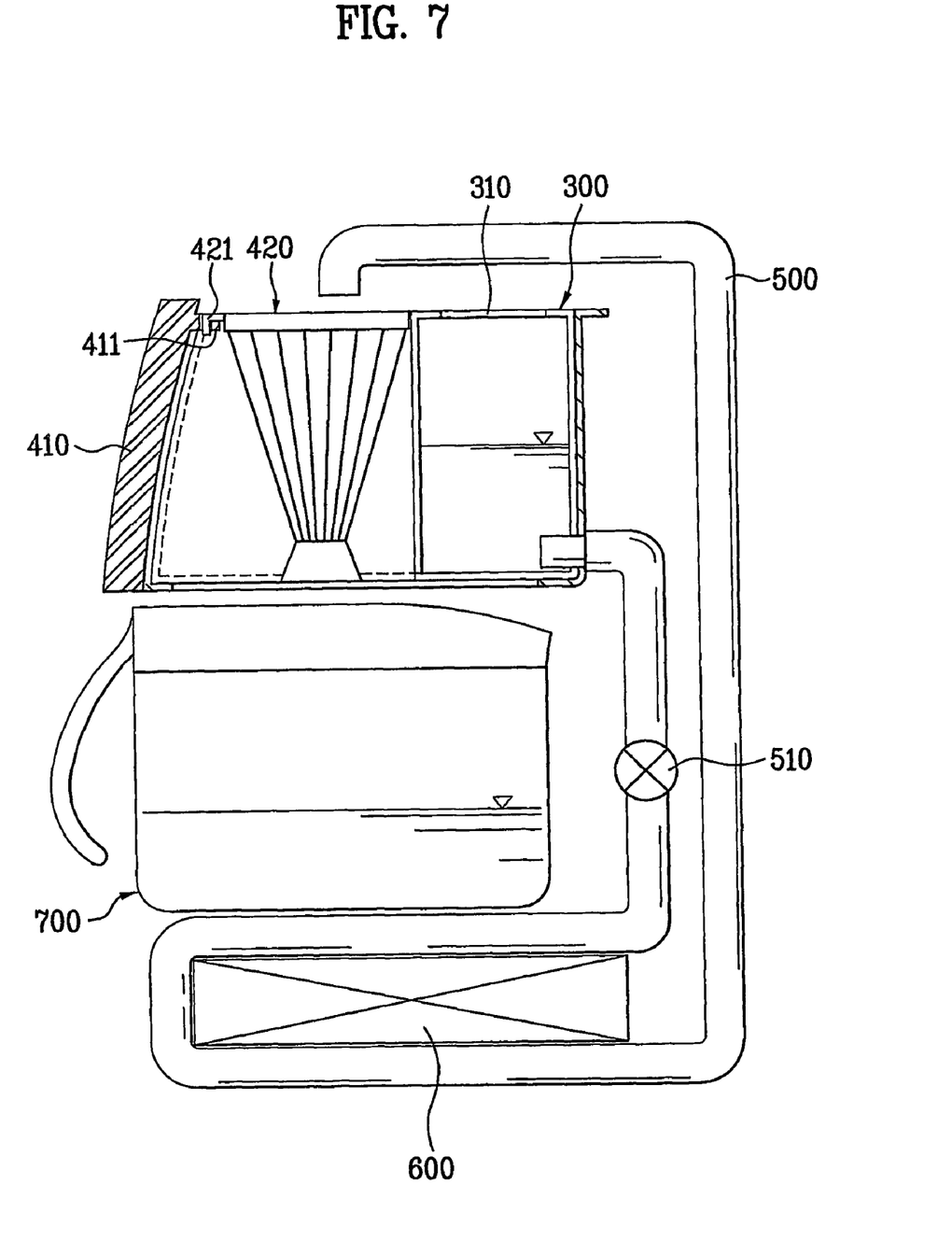
FIG. 7 illustrates a cutaway view showing a coffee maker without having a second housing in a microwave oven of FIG. 6.
Figure 8:
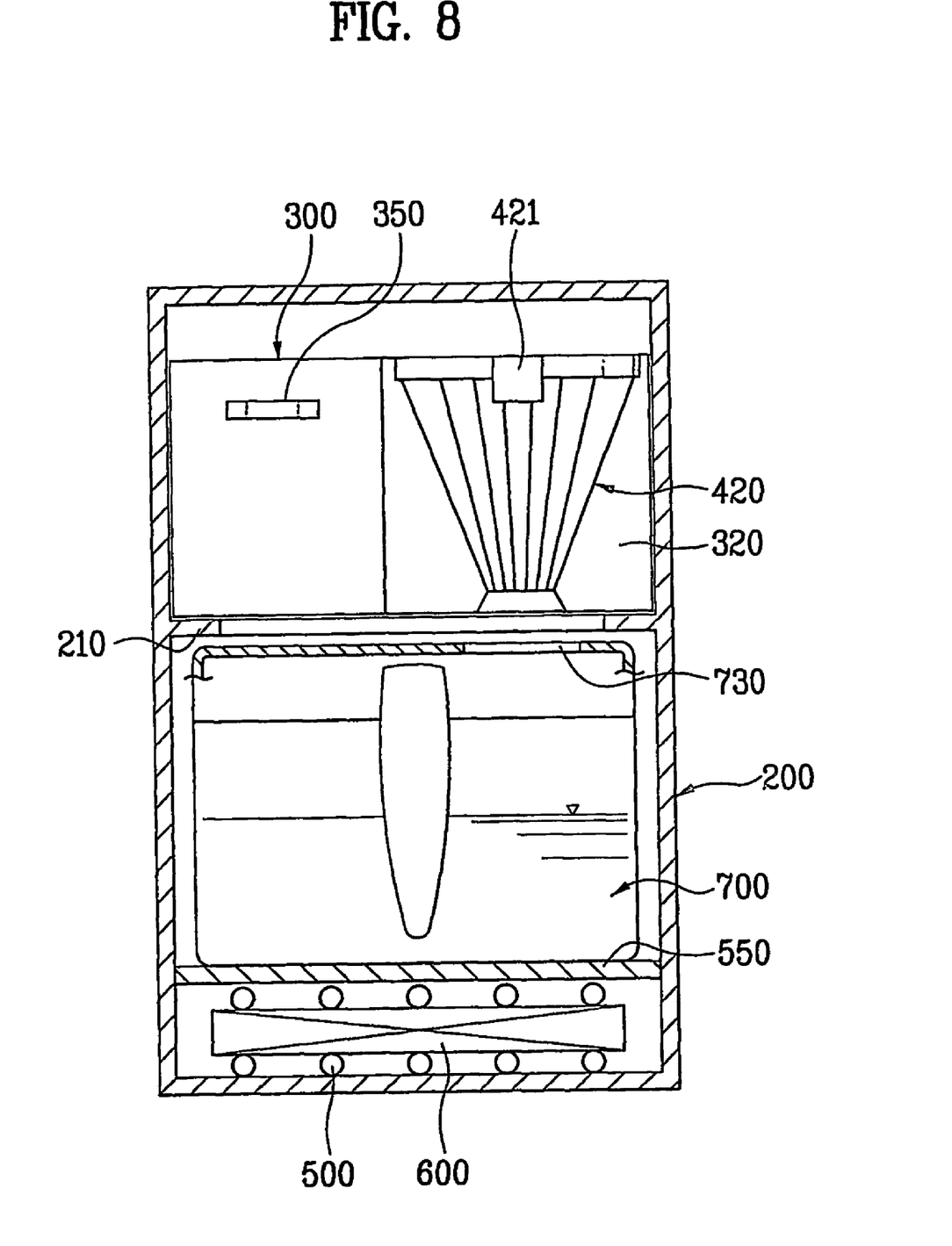
FIG. 8 illustrates a plane cross-sectional view showing a coffee maker in a microwave oven of FIG. 2.

In the mean time, the water supplying tube 500 is for providing the water in the water reservoir 300 to the filter basket assembly 400. As illustrated in FIG. 3 and FIG. 7, a first end of the water supplying tube 500 is coupled with the water reservoir 300 and a second end of the water supplying tube 500 is positioned at the top portion of the basket 420. Although described later, a part of the water supplying tube 500 is provided to be in contact with the heater 600 as illustrated in FIG. 4 and FIG. 8. In this case, the second end of the water supplying tube 500, through which water is flowed out, is provided at a higher place than the first end of the water supplying tube 500 through which water is flowed in.

When the water supplying tube 500 is provided as abovementioned, water stored in the water reservoir 300 is flowed in through the first end of the water supplying tube 500, is heated while passing through the portion being in contact with the heater 600, and then flowed out through the second end into the basket 420 by being risen by steam pressure. It is preferable that the portion being in contact with the heater 600 is made of a well-conducting material such that a larger amount of heat from the heater 600 is transmitted to the water flowing into the inside thereof.

Meanwhile, it is preferable that a check valve 510 is provided at a middle of the water supplying tube 500 for preventing water in the water supplying tube 500 from being flown backward toward the water reservoir 300. Although the check valve 510 is formed of various structures, one simple structure of those structures is described as follows.

A first end of the water supplying tube 500 being in contact with the water reservoir 300 has a smaller inside diameter and the portion adjacent to the heater 600 has a larger inside diameter than that of the portion being in contact with the water reservoir 300. A ball (not shown) is provided on an inner surface of the water supplying tube 500 having the larger inside diameter among the portions having different inside diameters. In this case, the ball is freely movable in the water supplying tube at the portion having the larger inside diameter. However, the ball is unmovable into the water supplying tube 500 at the portion having the smaller inside diameter and in a size enough for closing a water passage. If the check valve is constructed in the abovementioned way, the water is prevented from being flown backward by a following principle.

Water flown from the water reservoir 300 into the inside of the water supplying tube 500 moves to the portion being in contact with the heater 600 through the check valve 510. In this case, the portion having the smaller inside diameter is not closed because the ball is provided at the lower part by air pressure and water pressure. The portion of the water supplying tube 500 adjacent to the heater 600 is heated as the heater 600 is heated.

The ball is risen by the high pressure so as to prevent the portion having the small inside diameter of the water supplying tube 500 because the pressure inside of the water supplying tube 500 is increased when the water in the water supplying tube 500 is heated. When an entrance of the portion having the small inside diameter is closed, water is prevented from being flown backward because the water heated by the heater 600 is not risen toward the water reservoir 300. When the water is heated more in a case that the water is prevented from being flown backward, the water is risen toward the second end completely opened, and then supplied to the basket 420.

When a lot of amount of water is risen by the pressure and flown out toward the second end, the water stored in the water reservoir 300 is supplied to the lower part thereof because the pressure inside of the water supplying tube 500 is lowered, and the ball is descended. By repeating abovementioned process, the water is heated and the heated water is supplied to the basket 420 in a state that the water is prevented from being flown backward.

As aforementioned, the present invention includes a check valve 510 in a simple structure, the vale using water pressure, gravity, and steam pressure. However, the check valve 510 is not limited in the structure. In other words, it is possible to provide a separate valve being operated by outside power for temporarily closing the passage of the water supplying tube 500 while the ware is boiling.

Meanwhile, the heater 600 is for heating the water flowing in the water supplying tube 500 and is provided at a lower part of the second housing 200 as illustrate in FIG. 3 and FIG. 4, and FIG. 7 and FIG. 8. It is preferable that the heater 600 is provided to be in contact with the water supplying tube 500.

The heater 600 not only performs a role of heating the water in the water supplying tube 500 but also heating coffee stored in the container 700. For this, it is preferable that a heating plate 550 is provided on top of the heater 600 as illustrated in FIG. 4 and FIG. 8.

The heating plate 550 supports the container 700 and transmits the heat of the heater 600 to the container 700. Accordingly, it is preferable that the heating plate 550 is made of a high conductive material. However, it is preferable that other portion of the second housing 200 includes an insulating material for preventing the heat transmitted to other places except the heating plate 550.

Meanwhile, the container 700 is withdrawn from or inserted into the second housing 200 through the opening 212 of the front panel 211, and stores coffee dropped from the filter basket assembly 400, particularly from the basket 420. In the present invention, a carafe is provided as the container 700. However, the container 700 is not limited to this, but can be replaced by something such as a cup at need.

In a case that the container 700 includes the carafe, a handle 710 is provided thereto for the user to easily grasp the container 700. On the opened top of the carafe, a lid 720 is provided, and a hole 730 is provided at the lid 720 for taking coffee dropped from the basket 420.

In the first embodiment, the hole 730 is provided in the middle of the lid 720 as illustrated in FIG. 2. However, in the second embodiment, the hole 730 is provided to be eccentric from the center as illustrated in FIG. 7 and FIG. 8 because the position of the basket 420 is eccentric in the second embodiment.

The microwave oven having the coffee maker in accordance with the present invention is operated as follows. In describing the operation, a basic function and related contents of the microwave oven, the basic function for heating foods in the cooking chamber by using microwave, are described in the description of the related art thereby will be omitted. Accordingly, an operation and the function of the coffee maker being additionally provided to the microwave oven of the present invention will be described hereinafter.

Figure 9B:
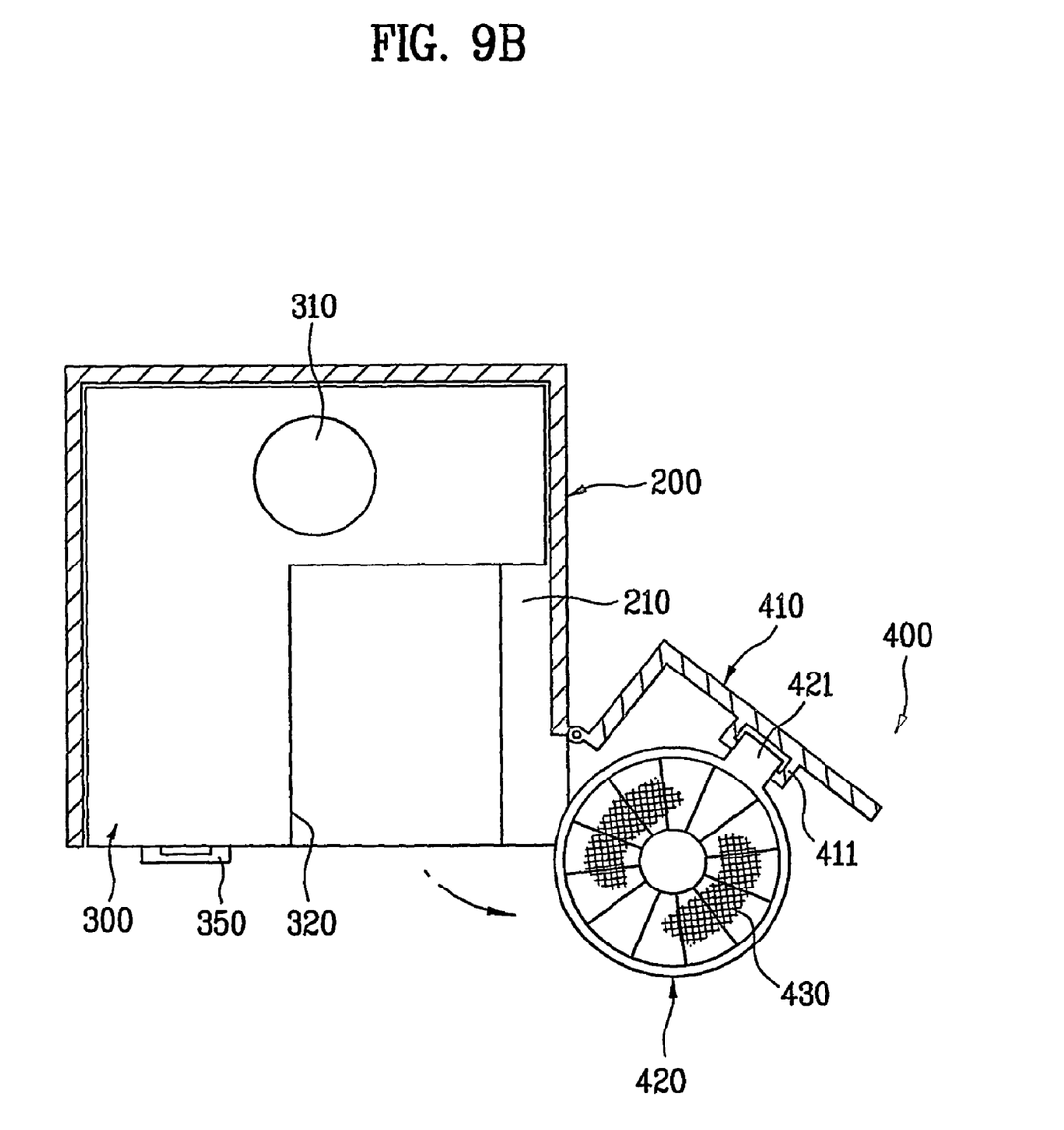
Figure 9C:
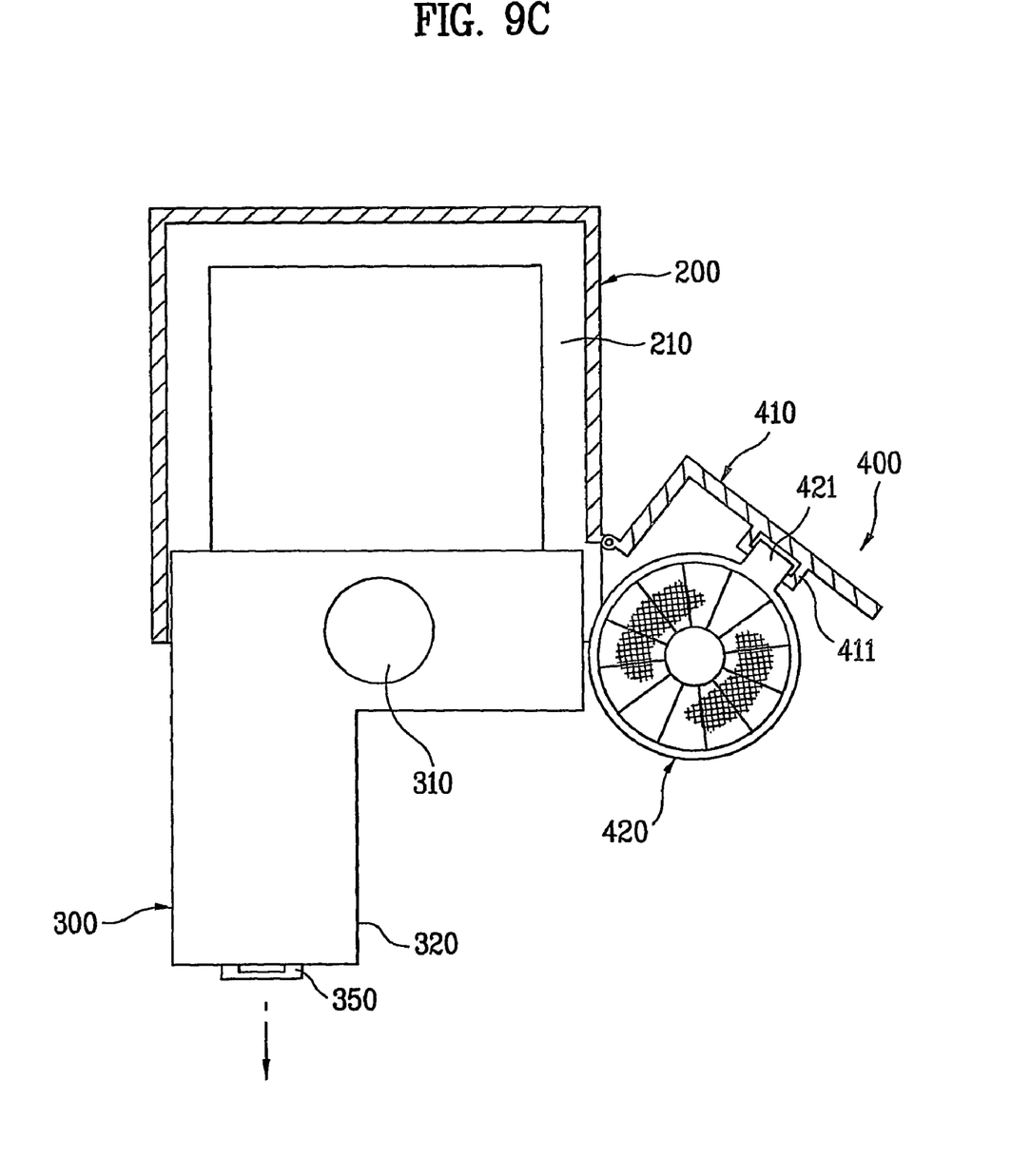

First, in the state illustrated in FIG. 5a and FIG. 9a, when the filter basket assembly 400 is rotated as illustrated in FIG. 9b, and then a reasonable amount of coffee is supplied into the basket 420. If needed, the water reservoir 300 is withdrawn to outside and inserted back into the second housing 200 after supplying water as illustrated in FIG. 5c and FIG. 9c. The cover 410 of the filter basket assembly 400 is then closed and for operating the coffee maker by using a key provided at the front panel 211.

When the coffee maker is operated, the heater 600 heats the water supplying tube 500 and the heating plate 550 while generating heat. At the same time, the water is supplied to the inside of the water supplying tube 500 from the water reservoir 300 and the water supplied to the water supplying tube 500 is heated by the heater 600.

When a predetermined time is passed, the water is boiled and the pressure in the water supplying tube 500 is increased, the boiling water is risen by the high stream pressure and then flown out through the second end of the water supplying tube 500 because the ball closes the passage of the water supplying tube 500.

The coffee powder is then dissolved in the basket 420 and the coffee in liquid state is dropped from the basket and stored in the container 700. The coffee stored in the container 700 is heated by the heating plate 550, and thus the user can enjoy warm coffee at any time.

Meanwhile, after the coffee is made, the basket needs to be cleaned. At this time, the cover 410 is rotated and the cover is separated from the cover 410, and then each of the filter 430 and the basket 420 is cleaned. If needed, the water reservoir 300 is withdrawn outside and then cleaned.

When the cleaning of the basket 420 and the water reservoir 300 is finished, the water reservoir 300 is inserted back into the second housing 200, the extension member 421 of the basket 420 is inserted and fixed into the supporter 411, and the cover 410 is closed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

As abovementioned, it is very convenient in that the present invention has not only the basic function of the microwave oven but also the function of brewing coffee the modern people enjoy.

If other electric components are densely provided in the component chamber, there is no need to reduce the space of the cooking chamber or enlarge the total space of the microwave oven because the coffee maker is provided in the component chamber having space. Therefore, the present invention increases the space usability of kitchen.

The coffee maker is used hygienically because the filter basket assembly and the water reservoir are separable from the coffee maker.

What is claimed is:

1. A microwave oven having a coffee maker, comprising:
   a first housing including a cooking chamber which is opened or closed by a door, and a component chamber with electric components provided therein for irradiating microwaves into the cooking chamber;
   a second housing provided in the first housing and having an open side;
   a water reservoir provided in the second housing;
   a filter basket assembly provided to be withdrawn from or inserted into inside of the second housing, the filter basket assembly being separated from the water reservoir;
   a water supplying tube supplying water in the water reservoir to the filter basket assembly;
   a heater for heating water flowing through the water supplying tube; and
   a container provided to be withdrawn from or inserted into the second housing for receiving coffee dripped from the filter basket assembly,
   wherein the water reservoir includes a handle projected on an outer surface thereof for easy grip.

2. The microwave oven having a coffee maker of claim 1, wherein the second housing is provided in front of the component chamber.

3. The microwave oven having a coffee maker of claim 1, wherein the second housing is provided next to the cooking chamber.

4. The microwave oven having a coffee maker of claim 1, wherein the water reservoir includes a receiving portion recessed on an outer surface of the water reservoir for receiving a part of the filter basket assembly.

5. The microwave oven having a coffee maker of claim 1, wherein the water reservoir and the filter basket assembly are provided at a same height.

6. The microwave oven having a coffee maker of claim 1, wherein the water reservoir is provided to be withdrawn from the second housing.

7. The microwave oven having a coffee maker of claim 1, wherein the second housing includes a bracket projected from an inner wall thereof for supporting the water reservoir.

8. The microwave oven having a coffee maker of claim 7, wherein the bracket is elongated and is formed on an inner wall of the second housing for withdrawing the water reservoir from the second housing.

9. The microwave oven having a coffee maker of claim 1, wherein the filter basket assembly is hinge-coupled with the second housing.

10. The microwave oven having a coffee maker of claim 9, wherein the filter basket assembly is rotatably attached to the second housing such that the water reservoir is easily withdrawn.

11. The microwave oven having a coffee maker of claim 1, wherein the filter basket assembly comprises:
    a cover hinge-coupled to a front of the second housing; and
    a filter basket separably coupled to the cover.

12. The microwave oven having a coffee maker of claim 11, wherein the filter basket assembly further comprises:

an extension member provided at any one of the cover and the basket; and a supporter provided at the other one of the cover and the basket for supporting the extension member.

13. The microwave oven having a coffee maker of claim 11, wherein the filter basket assembly further comprises a filter in a form of net inserted into the filter basket.

14. The microwave oven having a coffee maker of claim 1, wherein the filter basket assembly comprises:

a cover hinge-coupled to a side of the second housing; and a filter basket separably coupled to the cover.

15. The microwave oven having a coffee maker of claim 14, wherein the filter basket assembly further comprises:

an extension member provided at any one of the cover and the basket; and a supporter provided at the other one of the cover and the basket for supporting the extension member.

16. The microwave oven having a coffee maker of claim 14, wherein the filter basket assembly further comprises a filter in a form of net inserted into the filter basket.

17. The microwave oven having a coffee maker of claim 1, wherein the container is withdrawn separate from the filter basket assembly.

* * * * *